United States Patent [19]
Lee

[11] Patent Number: 6,021,179
[45] Date of Patent: Feb. 1, 2000

[54] COMPUTER SYSTEM WITH AN AUTOMATIC ANSWERING DEVICE AND AN AUTOMATIC ANSWERING METHOD

[75] Inventor: Surg-June Lee, Suwon, Rep. of Korea

[73] Assignee: SamSung Electronics Co., Ltd., Kyungki-do, Rep. of Korea

[21] Appl. No.: 08/858,503

[22] Filed: May 19, 1997

[30] Foreign Application Priority Data

May 17, 1996 [KR] Rep. of Korea ..................... 96 16633

[51] Int. Cl.[7] .................................................. H04M 1/64
[52] U.S. Cl. ...................... 379/82; 379/372; 395/750.05
[58] Field of Search ................ 379/67.1, 70, 82, 379/88.13, 88.16, 88.28, 88.27, 90.01, 106.01, 106.04, 372, 373, 387, 419, 422, 441; 395/750.01, 750.03, 750.05

[56] References Cited

U.S. PATENT DOCUMENTS

| | | |
|---|---|---|
| 4,813,069 | 3/1989 | Tanaka et al. . |
| 4,847,892 | 7/1989 | Shelley . |
| 5,043,721 | 8/1991 | May . |
| 5,530,879 | 6/1996 | Crump et al. . |
| 5,577,106 | 11/1996 | Tanaka et al. . |
| 5,596,628 | 1/1997 | Klein .......................................... 379/93 |
| 5,689,715 | 11/1997 | Crump et al. ........................... 395/750 |
| 5,794,058 | 8/1998 | Resnick ..................................... 379/82 |
| 5,819,069 | 10/1998 | Wong et al. ............................. 395/500 |
| 5,822,692 | 10/1998 | Krishan et al. ......................... 455/419 |
| 5,870,613 | 2/1999 | White et al. ....................... 395/750.01 |

*Primary Examiner*—Scott Weaver
*Attorney, Agent, or Firm*—Robert E. Bushnell, Esq.

[57] ABSTRACT

A computer system has an automatic answering device and a method of automatically communicating an audio response message to a caller, in response to an incoming telephone call by the caller, when the system is in a hibernation state where the contents of all of the devices of the system have been saved and the system has substantially been turned off for the sake of reducing power consumption. The automatic answering device has an address generator for generating a set of addresses, a memory for storing audio response message data, an address selector, a data switch for switching data paths, and a digital-to-analog converter for converting the audio data into analog audio response signals. The audio response signals are sent through a modem to a caller so that the caller gets an audio response message indicating that the system is in the hibernation state.

12 Claims, 4 Drawing Sheets

COMPUTER SYSTEM WITH AN AUTOMATIC ANSWERING DEVICE AND AN AUTOMATIC ANSWERING METHOD

CLAIM OF PRIORITY

This application makes reference to, incorporates the same herein, and claims all benefits accruing under 35 U.S.C. §119 from an application for *A COMPUTER SYSTEM WITH AN AUTOMATIC ANSWERING DEVICE AND A METHOD FOR AUTOMATIC ANSWERING* earlier filed in the Korean Industrial Property Office on the 17$^{th}$ day of May 1996 and there duly assigned Serial No. 16633/1996, a copy of which application is annexed hereto.

BACKGROUND OF THE INVENTION

1. Field of the Invention

The present invention relates to a computer system having an automatic answering device and a method for automatically answering and providing an audio response message to a caller, in response to an incoming telephone call by the caller during a time that the computer system is in a hibernation state.

2. Description of the Related Art

Recently, in computer design technologies, low-power designs have been required as well as high-performance designs. One of the typical computer systems having power saving features is the so called hibernation system. When such a system is not operated for a predetermined time period, the system goes into a suspend mode such that the operating conditions of the system are stored in a nonvolatile storage device, such as a hard disk drive, and then the entire system is substantially powered off for the sake of reducing power consumption. During this suspend mode, the computer system saves the operating conditions until the system becomes active by turning the power switch on. When the system awakes from the hibernation state, namely, when the system is powered on again, the system resumes operation according to the saved operating conditions so as to go back into the previous state, i.e., the normal state.

Being powered off owing to the abrupt interruption of electric power, the hibernation system also saves the contents of all devices in the hard disk drive by means of a built-in battery or a basic uninterruptable power supply (UPS), and then turns off. If the system is powered on again, the system resumes operation and returns to the previous state.

There has been a recent trend of remotely controlling a computer system or computer-controlled machine, such as an electric home application, by using a modem. As is well known, the modem is connected between the computer system and a telephone network, and converts a first type of signal, for example, a digital signal from the system into a second type of signal, for example, an analog signal suitable for the telephone network, and vice versa.

However, when the system is in the hibernation state and an incoming call is received, it takes one or more minutes for the system to awake out of the hibernation state and go back to the normal state. Thus, there is a possibility that a caller, having no understanding of the system, may hang up because the system does not immediately respond to his call.

The patent to Tanaka et al., U.S. Pat. No. 4,813,069, entitled *Computer System Having Automatic Answering telephone function*, discloses a system including a main control unit, a telephone control unit, a voice information storage medium, a program unit for automatically answering and processing telephone calls, a program unit for performing data processing, and a mode setting circuit for setting the automatic telephone answering and the data processing to be performed.

As shown in FIG. 1 of Tanaka et al., a computer system is shown having an automatic answering function in which a message recorded on cassette tape is automatically played back to a caller and a telephone message from the caller recorded on the cassette tape. Tanaka et al. however does not teach or suggest the recited computer system having a modem and/or an automatic answering device capable of storing and reading out digital message data as in the present invention.

The following additional patents each disclose features in common with the present invention but are not as pertinent as the Tanaka et al. patent discussed above: U.S. Pat. No. 5,043,721 to May, entitled *Paging Accessory For Portable Information/Computing Devices*, U.S. Pat. No. 4,847,892 to Shelley, entitled *Dial-In data Transmission System With Standby Capability*, U.S. Pat. No. 5,577,106 to Tanaka et al., entitled *Communication Apparatus For Use With Public Telephone Network*, and U.S. Pat. No. 5,530,879 to Crump et al, entitled *Computer System Having Power Management Processor For Switching Power Supply Form One State To Another Responsive To A Closure Of A Switch, A Detected Ring Or An Expiration Of A Timer.*

SUMMARY OF THE INVENTION

It is therefore an object of the present invention to provide a computer system having an automatic answering device, which capable of automatically answering an incoming telephone call when the system is in a hibernation state where in the contents of all of the devices in the system have been stored in an auxiliary storage device and the entire system has substantially been turned off.

It is another object of the present invention to provide a method of automatically communicating an audio response message to a caller in a computer system having an automatic answering device, in response to an incoming telephone call by the caller, when the system is in a hibernation state where in the contents of all of the devices in the system have been stored in an auxiliary storage device and the entire system has substantially been turned off.

According to an aspect of the present invention, a computer system is provided with a main unit having a bus, a storage connected to the bus for storing programs and data, and a central processing unit (CPU) connected to the bus and for controlling the operation of the entire system and for executing the arithmetical and logical functions contained in the stored programs; a modem connected between the bus and a telephone network, for processing telephone calls from the telephone network when the main unit is in a hibernation state where in the contents of all of the devices in the main unit have been stored in the storage means and the main unit has substantially been turned off, and for generating a wake-up signal in response to an incoming telephone call which has been received via the telephone network during the hibernation state; and an automatic answering providing analog audio response signals to the modem in response to the wake-up signal so that the modem transmits the audio response signals to the telephone network.

According to the above-described computer system of the present invention, a caller gets an audio response message that the system is in the hibernation state. The caller thus will wait without hanging up until the system resumes operation, having had no idea of the system features. In a preferred embodiment, the modem comprises a means for generating the wake-up signal in response to a ring signal associated with the incoming telephone call.

In another embodiment, the automatic answering device may be constructed with means for sequentially generating a set of first addresses in response to the wake-up signal; a digital memory storing audio data, of which a read operation is executed in response to the wake-up signal; means for selectively providing the first addresses and a set of second addresses generated by the main unit to the digital memory in response to a set-up signal generated by the main unit and indicative of an audio data write operation; and means for converting the audio data from the digital memory into the audio response signals.

According to another aspect of the present invention, a method is provided for automatically answering an incoming telephone call received via a telephone network in a computer system which has a modem connected to the telephone network and is in a hibernation state where in the contents of all of the devices of the system have been saved and the system has substantially been turned off, by detecting a ring signal associated with the incoming telephone call; and sending an audio response message that the system is in the hibernation state to the telephone network and simultaneously resuming the operation of the system when the ring signal has been detected. In this method, the audio response message may be sent to the telephone network repeatedly until the system returns to a normal operation state.

The foregoing features and advantages of the invention will be more fully described in the accompanying drawings.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1B:
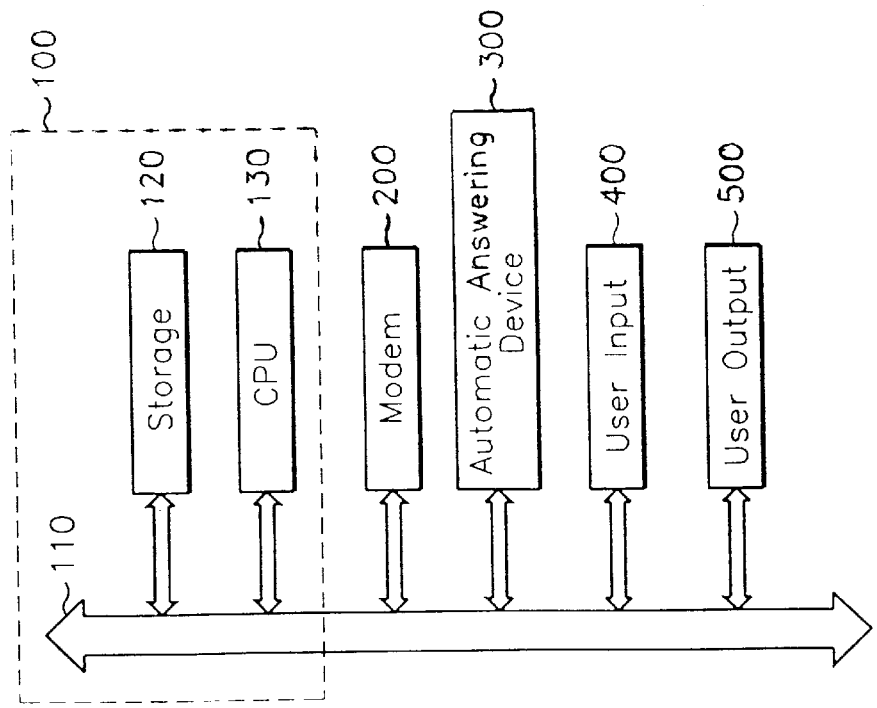
FIG. 1B is a functional block diagram showing electric circuit arrangements of the computer system in FIG. 1A.
Figure 1A:
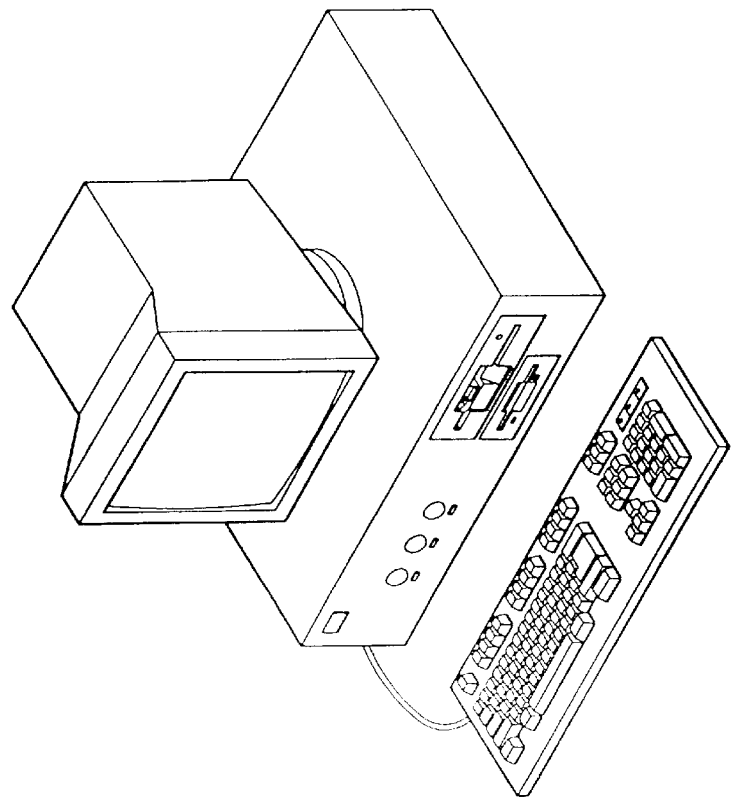
FIG. 1A is a schematic perspective view of a computer system having a modem and an automatic answering device according to an embodiment of the present invention.

A circuit diagram of the computer system illustrated in FIG. 1A, as constructed according to the principles of the present invention is shown in FIG. 1B. The computer system comprises a main unit 100, a modem 200 which exchanges files, programs, images, and audio information with other systems or callers across telephone networks, an automatic answering device 300 for answering audio messages to the callers, user input devices 400 such as a keyboard, a mouse, a digitizer tablet, a built-in microphone, etc., and user output devices 500 such as a cathode ray tube (CRT) display device, a liquid crystal display (LCD) device, a printer, a plotter, loudspeakers, etc.

As is well known, the main unit 100 has a bus 110 for communicating information. The main unit 100 includes several storage devices 120 which are made up of a dynamic semiconductor memory such as a random access memory (RAM), a static semiconductor memory such as a read only memory (ROM), auxiliary storage such as a floppy disk drive (FDD) and a hard disk drive (HDD), which are connected to the bus 110 and store programs and data. The main unit 100 further includes a central processing unit (CPU) 130 connected to the bus 1 10 for controlling the operation of the entire system and for executing the arithmetical and logical functions contained in the stored programs.

Figure 2:
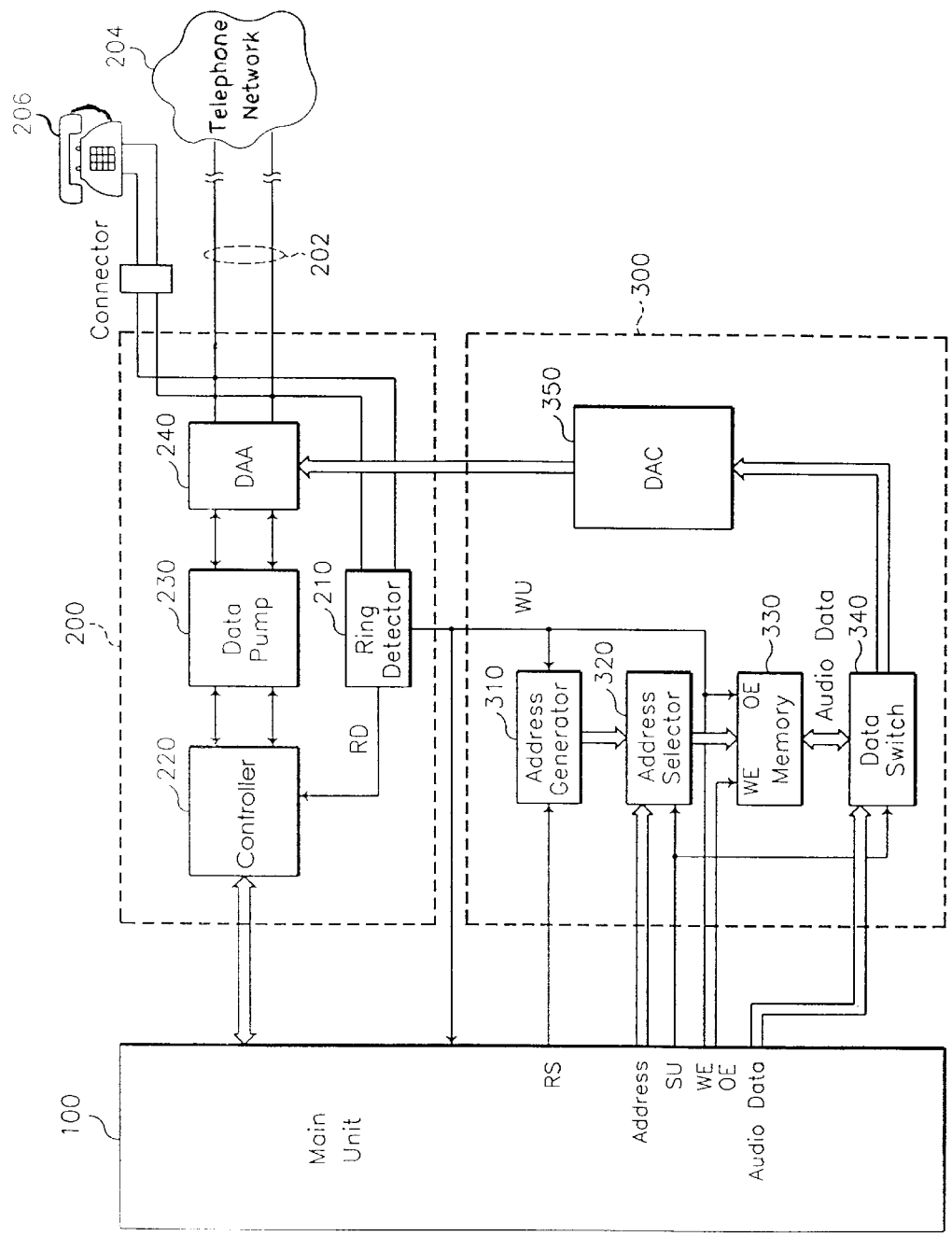
FIG. 2 is a detailed circuit diagram of the modem and the automatic answering device shown in FIG. 1B.

FIG. 2 is a detailed circuit diagram of the modem 200 and the automatic answering device 300 shown in FIG. 1B. Referring to FIG. 2, the modem 200 permits the exchange of information with a caller or a remote modem-supported data terminal (not shown), such as another computer system, over the telephone lines 202 by providing an interface function between the main unit 100 and a telephone network 204. The modem 200 is typically plugged into a telephone jack (not shown) connected to a telephone lines 202 and is positioned inside or adjacent to the main unit 100.

As shown in FIG. 2, the modem which servers as an interface between the main unit 100 and the telephone network 204 has four major sections, that is, a ring detector 210, a controller 220, a data pump 230 and a data access arrangement (DAA) 240.

The ring detector 210 receives a ring signal associated with an incoming call via telephone lines 202 and generates a binary ring detect signal RD and a binary wake-up signal WU. The ring detect signal RD is provided to the controller 220 and the wake-up signal WU is provided to the main unit 100 and the automatic answering device 300. The controller 220 has a system interface (not shown), which compresses data from the main unit 100 through the system interface before sending them to the data pump 230 and decompresses data coming from the data pump 230 before sending them through the system interface to the main unit 100. The data pump 230 converts digital data from the controller 220 into analog signals which are sent to the telephone network 204 through the telephone lines 202 and converts analog signals received from the telephone lines 202 into digital data. The pump 230 also modulates and demodulates data in accordance with several protocols such as a data protocol, a voice protocol, a facsimile protocol, and so on. The DAA 240 transmits analog information between the telephone network 204 and the data pump 204 via the telephone lines 202. The DAA 240 also can be directly connected to a telephone 206. The ring detector 210 and the DAA 240 serves as a telephone interface.

The automatic answering device 300 comprises an address generator 310, an address selector 320, a memory 330 for storing audio response message data, a data switch 340 for switching data paths, and a digital-to-analog converter (DAC) 350.

The address generator 310 is made up of a counter circuit, which receives the wake-up signal WU from the ring detector 210 and generates a set of addresses in order when the wake-up signal WU is at a predetermined logic level (for example, a high level). The address generator 310 also stop generating the addresses when a reset signal RS received from the main unit 100 is at another predetermined logic level (for example, a low level). The address selector 320 is made up of a multiplexer circuit which has first address input terminals connected to the address generator 310, second address input terminals connected to the main unit 100 and address output terminals connected to address paths of the memory 330. The address selector 320 receives the addresses from either the address generator 310 or the main unit 100 in accordance with a set-up signal SU received from the main unit 100 and provides the received addresses to the memory 330. Specifically, the address selector 320 provides the addresses received from the main unit 100 to the memory 330 when the set-up signal SU is active. To the contrary, the address selector 320 provides the addresses received from the address generator 310 to the memory 330 when the set-up signal SU in inactive. The memory 330 comprises a RAM device in which a write operation is executed when a write enable signal WE from the main unit 100 becomes active and a read operation is executed when either an output enable signal OE from the main unit 100 or the wake-up signal WU from the ring detector 210 becomes active, or a mask ROM into which predetermined audio response message data having been written during its manufacturing process. The data switch 340 connects data paths of the memory 330 to either the main unit 100 or the DAC 350 in accordance with the set-up signal SU. The DAC 350 converts the digital audio data received from the memory 330 through data switch 340 into analog audio signals. The analog audio signals are provided to the DAA 240 in the modem 200.

Figure 3:
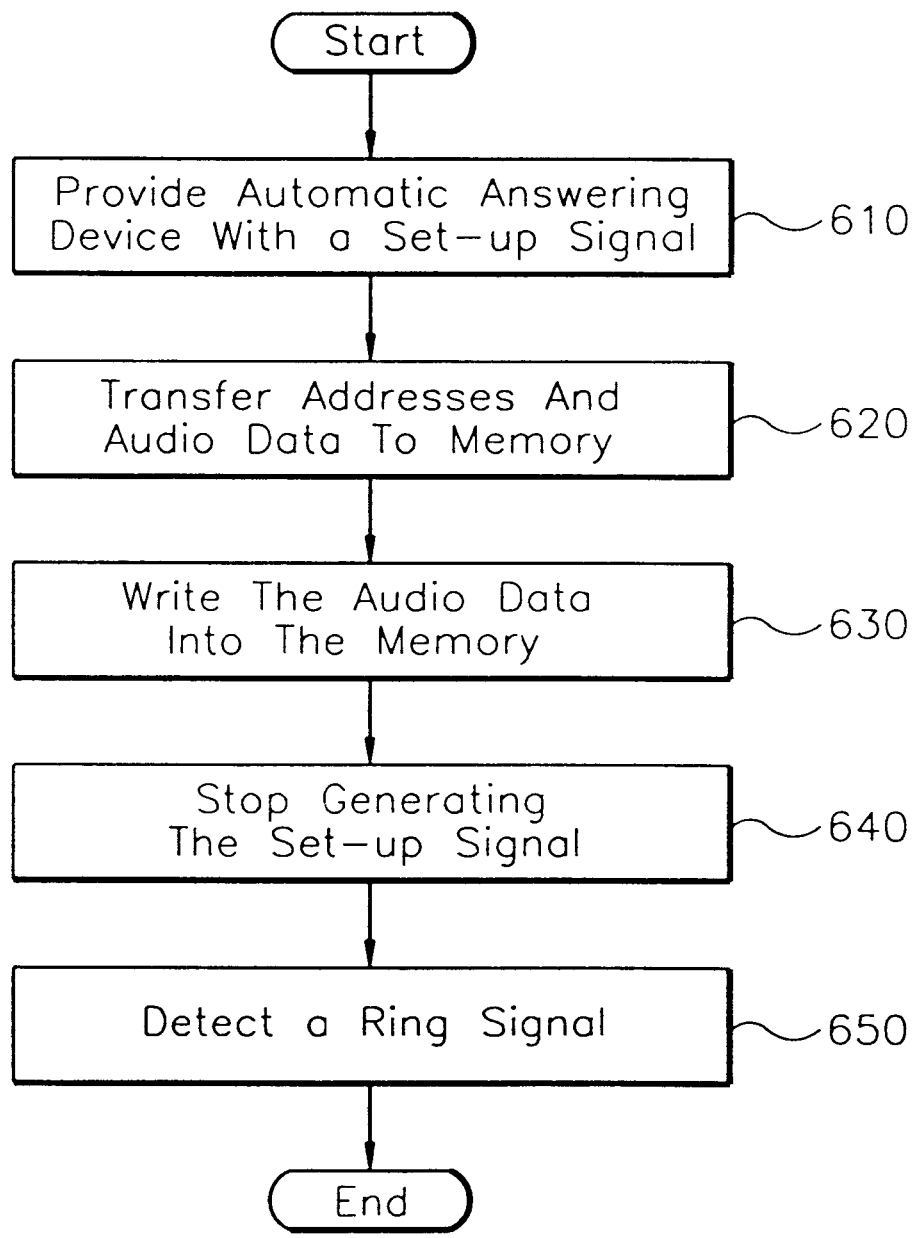
FIG. 3 is a flowchart of an audio data set-up operation in which the main unit writes audio data into the memory shown in FIG. 2.

FIG. 3 shows an audio data set-up operation, i.e., the write operation of the memory 330 in which the main unit 110 writes audio response message data for the automatic answering into the memory 330. Referring to FIG. 3, the main unit 100 provides the address selector 320 and the data switch 340 with the set-up signal SU of a predetermined level (for example, a high level), step 610. At this time, the data paths of the memory 330 are connected to the main unit 100 through the data switch 340 and the address paths of the memory 330 are connected to the main unit 100 through the address selector 320. The main unit 100 transfers a set of addresses and the audio response message data that don't hang up and wait until the main unit 100 awakes out of a hibernation state, where in the contents of all of the devices in the main unit 100 have been stored in an auxiliary storage device such as an HDD and the main unit 100 has substantially been turned off, to the memory 330 together with the write enable signal WE, step 620. While the write enable signal WE is active, the audio response message data is written into the memory 330, step 630. Next, the main unit 100 makes the set-up signal SU inactive, in other words, the main unit 100 stops generating the set-up signal SU, step 640. As a result, the data paths of the memory 330 are connected to the DAC 350 through the data switch 340. Finally, modem 200 detects a ring signal associated with an incoming telephone call, step 650.

Figure 4:
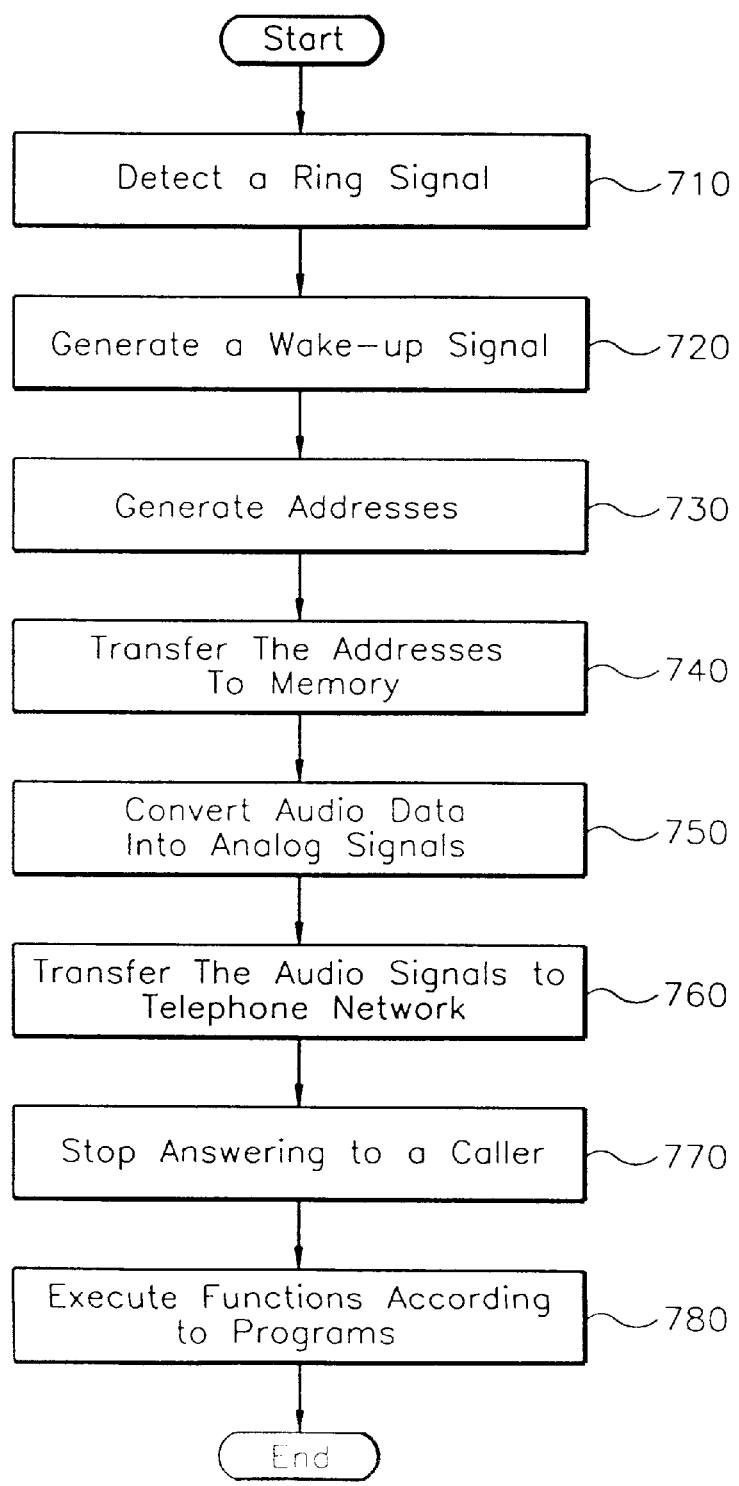
FIG. 4 is a flowchart of an automatic answering method for the computer system being in a hibernation state.

FIG. 4 shows an automatic answering method for the computer system which is in the hibernation state. Referring to FIG. 4, if the modem 200 is provided with a ring signal associated with an incoming call by a caller while the main unit 100 in the hibernation state for saving power, step 710, the ring detector 210 generates the ring detect signal RD and the wake-up signal WU, step 720. The main unit 100 awakes from the hibernation state and resumes operation in response to the wake-up signal WU. Then, the read operation of the memory 330 is to be executed, the address generator 310 also begins to generate a set of addresses in response t the wake-up signal WU, step 730. The address selector 320 transfers the addresses generated by the address generator 310 to the memory since the set-up signal SU is inactive, step 740. At this time, the data switch 340 connects the data paths of the memory 330 to the DAC 350 since the set-up signal SU is inactive. The DAC 350 converts the audio response message data from the memory 330 into analog response signals and transfers them to the DAA 240 within the modem 200, step 750. The modem 200 transmits the audio response signals through the telephone lines 202 to the telephone network 204, step 760, so that the caller gets an audio response message that the system is in the hibernation state. As a result, the caller waits until the main unit returns to the normal state. At this time, the audio response message may be sent to the telephone network repeatedly until the main unit, i.e., the computer system goes back to the normal state completely. Next, the main unit generates the reset signal RS as soon as it returns to the normal state, step 770, so that the address generator 310 stops generating the addresses. Consequently, the automatic answering operation stops. Finally, the main unit 100 controls the operation of the entire system and executing the arithmetical and logical functions contained in programs, step 780.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A computer system comprising:
   a main unit having a bus, a storage means connected to the bus for storing programs and data, and a central processing unit connected to the bus for controlling the operation of the entire system and for executing arithmetical and logical functions contained in the stored programs;
   a modem connected between the bus and a telephone network, for processing telephone calls from the telephone network when the main unit is in a hibernation state wherein contents of all devices in the main unit have been stored in the storage means and the main unit has substantially been turned off, and for generating a wake-up signal in response to an incoming telephone call which is received via the telephone network during the hibernation state; and
   an automatic answering means for providing audio response signals of analog signals to the modem in response to the wake-up signal so that the modem transmits the audio response signals to the telephone network, whereby a caller gets an audio response message indicating that the system is waking up from the hibernation state.

2. The computer system of claim 1, the modem comprising a means for generating the wake-up signal in response to a ring signal associated with the incoming telephone call.

3. The computer system of claim 1, the automatic answering means comprising a means for sequentially generating a set of first addresses in response to the wake-up signal, a digital memory for storing audio data, of which a read operation is executed in response to the wake-up signal, a means for selectively providing the first addresses and a set of second addresses generated by the main unit to the digital memory in response to a set-up signal generated by the main unit and indicative of an audio data write operation, and a means for converting the audio data from the digital memory into the audio response signals.

4. The computer system of claim 2, the automatic answering means comprising a means for sequentially generating a set of first addresses in response to the wake-up signal, a digital memory for storing audio data, of which a read operation is executed in response to the wake-up signal, a means for selectively providing the first addresses and a set of second addresses generated by the main unit to the digital memory in response to a set-up signal generated by the main unit and indicative of an audio data write operation, and a means for converting the audio data from the digital memory into the audio response signals.

5. The computer system of claim 3, the digital memory comprising a mask read only memory.

6. The computer system of claim 4, the digital memory comprising a mask read only memory.

7. The computer system of claim 3, the automatic answering means further comprising a means for connecting the digital memory to the bus when the set-up signal is active and connecting the digital memory to a digital-to-analog converting means when the set-up signal is inactive.

8. The computer system of claim 4, the automatic answering means further comprising a means for connecting the digital memory to the bus when the set-up signal is active and connecting the digital memory to a digital-to-analog converting means when the set-up signal is inactive.

9. The computer system of claim 7, the digital memory comprising a dynamic random access memory, of which a write operation is executed in response to a write enable signal generated by the main unit.

10. The computer system of claim 8, the digital memory comprising a dynamic random access memory, of which a write operation is executed in response to a write enable signal generated by the main unit.

11. A method of automatically answering an incoming telephone call received via a telephone network in a computer system which has a modem connected to the telephone network and is in a hibernation state where contents of all devices of the system have been saved and the system has substantially been turned off, the method comprising:

detecting a ring signal associated with the incoming telephone call; and sending an audio response message to the telephone network indicating that the system is in the hibernation state and simultaneously sending a signal causing the system to proceed to resume to its normal operation state when the ring signal has been detected.

12. The method of claim 11, the audio response message being sent to the telephone network repeatedly until the system returns to the normal operation state.

* * * * *